United States Patent [19]

Scott

[11] Patent Number: 4,711,750

[45] Date of Patent: Dec. 8, 1987

[54] ABRASIVE CASTING PROCESS

[75] Inventor: John J. Scott, Niagara Falls, Canada

[73] Assignee: Norton Company, Worcester, Mass.

[21] Appl. No.: 283,600

[22] Filed: Jul. 15, 1981

Related U.S. Application Data

[60] Division of Ser. No. 30,501, Apr. 16, 1979, abandoned, which is a continuation-in-part of Ser. No. 861,836, Dec. 19, 1977, abandoned.

[51] Int. Cl.$^4$ ............................................. B29B 9/04
[52] U.S. Cl. .................................... 264/144; 264/118
[58] Field of Search ............... 264/144, 118; 164/432, 164/433

[56] References Cited

U.S. PATENT DOCUMENTS

| | | | |
|---|---|---|---|
| 3,193,888 | 7/1965 | Rochester | 164/432 |
| 4,070,796 | 1/1978 | Scott | 51/309 |
| 4,165,978 | 8/1979 | Sanzenbacher | 264/118 |

Primary Examiner—Jan H. Silbaugh
Assistant Examiner—Hubert C. Lorin
Attorney, Agent, or Firm—Rufus M. Franklin

[57] ABSTRACT

A continuous process for casting a molten metal oxide such as an aluminous oxide and more particularly an alumina-zirconia eutectic composition that is subsequently crushed to produce an abrasive is provided wherein two thin metal belts are brought into face-to-face relation and the molten oxide is poured into the nip between the belts as they come into face-to-face relation. The material that is being solidified maintains the belts slightly spaced apart on the order of some small fraction of an inch (e.g. 1/16) and the back surface of the belt is flooded with copious quantities of cooling fluid (e.g. water) to maintain the belts below red heat. The belts are held in closely spaced relation for a sufficient time to permit the abrasive to be cooled below red heat. The belts are then separated and the abrasive is discharged from between the belts. At this point the abrasive is no longer affected by contaminants in the air, this aspect of the invention being particularly important in those embodiments of the invention where the molten abrasive (e.g. alumina zirconia abrasive) contains reduction products such as sub-oxides or elemental metal particles. In a preferred embodiment of the invention the top belt can be considerably wider than the bottom belt so that there is no water maintained on an upwardly facing surface which is subsequently to contact the molten abrasive.

4 Claims, 6 Drawing Figures

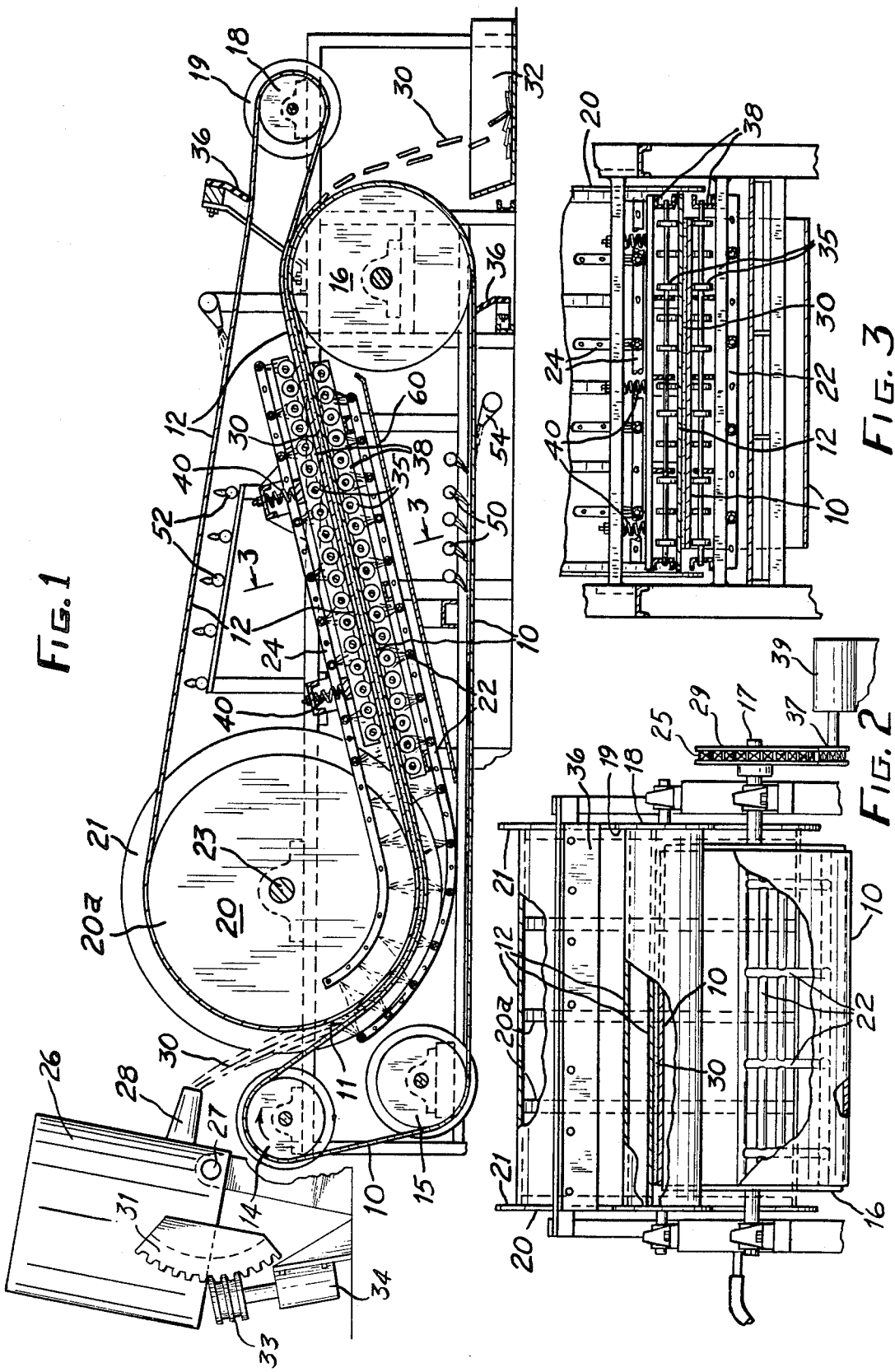

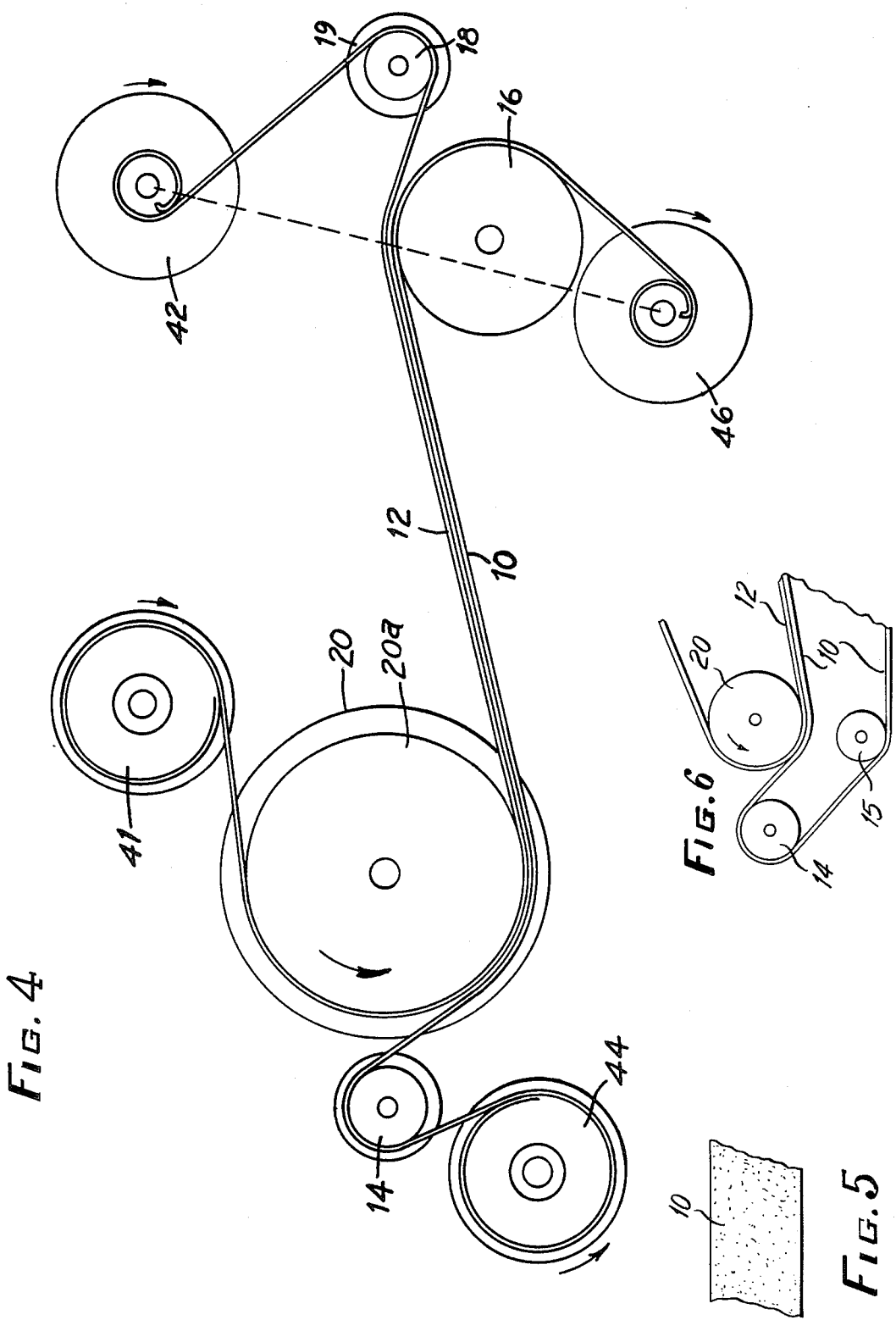

ABRASIVE CASTING PROCESS

This application is a division of application Ser. No. 30,501, filed Apr. 16, 1979, now abandoned, which in turn was a continuation-in-part of Ser. No. 861,836, filed Dec. 19, 1977, and now abandoned.

BACKGROUND OF THE INVENTION

This invention is directed to an apparatus and method for casting molten refractory and particularly to the very rapid chilling of molten aluminous abrasive such as the alumina-zirconia abrasives of the type described in the Rowse and Watson U.S. Pat. No. 3,891,408. In casting such molten alumina-zirconia abrasives it is highly desirable that the product be cast in a very thin layer so as to achieve the extremely rapid freezing of the abrasive under controlled conditions that inhibit the oxidation of the product as it is being cooled to a stable temperature. This provides extremely small crystal size, and where an alumina-zirconia eutectic is present, provides extremely small spacing between the zirconia rods and platelets in the eutectic mixture. It also provides for a high "tetragonal" zirconia content in the resultant crystalline structure. It is also believed that a substantial content of reduction products is helpful in these alumina-zirconia abrasives. While the exact function of these reduction products (either sub-oxides or metallic inclusions) is not fully understood, it is believed that they provide an improved performance for many types of grinding.

Whatever the function of the reduction products it is desired to preserve them and accordingly it is a principal object of the present invention to provide a method and apparatus which will give extremely rapid cooling of very thin sheets of molten abrasive.

A further object of the invention is to provide such method and apparatus which will protect the cooling abrasive from contact with an oxidizing environment until the temperature thereof has been reduced to below red heat, at which point the chilled abrasive can be safely exposed to oxidizing atmospheres such as the air and water for removing the final sensible heat therefrom without there being any harmful oxidizing reaction taking place that would detract from the properties desired in the final product.

PRIOR ART

The continuous casting of metallic sheets has long been known and is commercially practiced for the manufacture of sheets, rods and the like by mechanisms such as shown in U.S. Pat. No. 3,805.877 to Ward which is typical of the many patents assigned to the Southwire Company of Carlton, Ga. In this representative patent a metallic belt is run slightly spaced from a cooled drum and the molten metal is poured into the nip between the drum and the belt to provide a continuous casting. A related development, which is represented by U.S. Pat. No. 3,835,917, provides two Caterpillar treads which conjointly form opposite sides of a casting space into which molten metal is poured.

Other examples of the continuous casting of molten metal to solid sheet form are shown in U.S. Pat. Nos. 3,937,270 and 4,002,197 issued to the Hazelett Strip-Casting Corporation. These patents show the inject of molten metal under pressure into the nip formed by two endless belts that provide a planar cooling and solidifying passageway for converting the molten metal to solid form. A similar apparatus is shown in U.S. Pat. No. 3,193,888 wherein molten metal flows by gravity onto a lower belt and moves on into engagement with an upper belt to provide a confined passage for holding the metal in a plane while it solidifies. A much older continuous metal casting apparatus is shown in U.S. Pat. No. 49,053 where molten metal is fed by flowing it into the nip between two rollers disposed in a parallel horizontal position. The metal is solidified as it passes downwardly between the rotating rollers and issues vertically downwardly in the form of a cast sheet.

The continuous processing of other materials carried between endless belts is illustrated in U.S. Pat. No. 2,075,735 in which a process and apparatus for manufacturing plastic, semi-plastic and thermoplastic materials is described and in U.S. Pat. No. 3,891,376 for the continuous production of a chipboard product. In these disclosures heat and pressure is applied to the conveyed material to polymerize the resin content of the product. Then the resulting sheet may be cooled while in the conveyor.

In the prior art of casting molten abrasives some of the closest work is shown in patents owned by the Norton Company, assignee of the present invention. One of these is U.S. Pat. No. 3,377,660 to Marshall et al and another is a related C.I.P. application that led to U.S. Pat. No. 3,646,713 which describe the casting of a molten abrasive on the surface of one drum which is then pressed against another drum. A commercially utilized process is that shown in U.S. Pat. No. 3,993,119. This patent shows a number of vertically positioned heavy cold metal plates which are moved in a continuous stack under a pouring spout where molten abrasive is poured into the narrow spaces between the plates. The plates are subsequently separated a short distance away from the pouring position and the solidified, but still hot, abrasive is discharged therefrom. While the above patent does provide an excellent product, it is difficult to provide an extremely thin spacing between the heavy metal plates. As the spacing is decreased there are difficulties in completely filling the mold spaces and the process becomes less efficient with more of the poured product ending up as a cap on top of the mold. This cap must be discarded because of porosity, heavy oxidation and the like.

SUMMARY OF THE INVENTION

The present invention eliminates many of the problems of the prior art by providing a continuous process for casting extremely thin sheets of a metal oxide material. It is particularly applicable to casting of aluminous oxides containing partial, or complete, reduction products where the cast product can be provided in an extremely thin layer with very high yields of thinly cast product. It provides very complete protection of the cast product against contact by air, moisture and the like until the product has been cooled below a temperature at which any adverse reaction such as oxidation or pore forming can be created by reaction with air or moisture. The device is designed so that extremely high rates of cooling, utilizing a liquid such as water, may be employed. It also provides that the surfaces which are to contact the molten abrasives are completely dry at the time the abrasive is poured between the two belts as they are brought into face-to-face position with the very thin layer of freezing abrasive therebetween. By this means a dense, extremely finely crystalline, material is produced which has essentially the same oxidation state as that of the molten stream being cast. It does not contain induced porosity due to oxidation of the freezing abrasive or by the generation of steam or other gases resulting from contact with water during the casting process. In addition the surfaces of the belts in contact with the material being cooled, can be coated with an oxidation inhibiting material to further protect the material being cooled from the action of oxygen in the air.

When the product produced in this type of casting apparatus is an alumina-zirconia abrasive and the casting rate and belt speed is maintained such that the cast layer is about 1/16" thick the rod spacing in the alumina-zirconia eutectic is on the order of 1000-1800 angstroms and the percent tetragonal zirconia is on the order of 70% or higher. While the exact nature of the oxidation state of the product is not known, the gain on ignition of the product can be as high as 0.66% which indicates the presence of considerable reduction products (e.g. sub-oxides of zirconia or alumina or zirconium and metallic aluminum) in the cast product. The product protected against oxidation during cooling is typically extremely dense, showing almost complete freedom from any porous product of the type encountered when such an abrasive is cast onto a plate with one surface exposed to the air. It is also free of the "cap" which can be characteristic of a lot of product poured onto a mold of the type shown in U.S. Pat. No. 3,993,119 when there is inadequate filling of the mold and much of the product freezes at the top of the mold rather than in the space between the plates.

In comparison with the known art of casting and producing continuous sheet metal and producing continuous lengths of sheet plastic products, the herein described metal oxide casting process when used in its preferred form not only effects solidification of the molten mass in an oxidation resistant manner but also provides an improved apparatus that initiates the fracturing and breaking up of the solidified mass into small pieces. The brittle cast metal oxide is subjected to a bending step during an initial stage of the hardening step so that the fracture stresses and the beginning of separation of pieces of the hardened material is accomplished quite easily before the material reaches its ultimate hardness. By performing this preliminary cracking and partial separation of pieces of the solidified material from each other as distinguished from producing a solidified continuous sheet, the necessary reduction of the solidified metal oxide to grain sized abrasive particles is initiated with the beginning of the solidification of the product so that energy is saved in the production of the ultimate grain product and the pieces of the thin sheet of solidified pieces can be more conveniently handled for delivery to the following crushing operations that must be performed to produce the precisely sized abrasive grains desired.

IN THE DRAWINGS

FIG. 1 is a partially schematic side view of the casting apparatus;

FIG. 2 is an end view, partly broken away, looking at the outlet end of the conveyors;

FIG. 3 is a sectional view taken on line 3—3 of FIG. 1 showing a cross-section of the conveyor means along its straight path;

FIG. 4 is a schematic representation of another form of the conveyor means;

FIG. 5 is a plan view of a section of the conveyor surface coated with carbon black; and FIG. 6 is a detail view partly broken away, showing the conveyor of FIG. 1, with the conveyors moving in face-to-face contact when no molten metal oxide is being fed with the nip of conveyors.

DETAILED DESCRIPTION OF THE INVENTION

Referring to FIG. 1 there are shown two thin metallic belts, a lower belt 10 and an upper belt 12. As seen from FIGS. 2 and 3 the upper belt 12 is considerably wider than the lower belt 10 so that its edges extend a substantial distance beyond the edge of the lower belt 10 when the two belts are held in a sandwiched arrangement and with their back surfaces being sprayed with copious quantities of cooling water. The lower belt 10 passes over guide means such as rolls 14, 15 and driven roller 16 and the upper belt passes over other guide means such as roll 18 and disc roll 20. The roll 16 is driven by sprocket wheel 29 keyed to shaft 17 upon which roller 16 is carried. The sprocket wheel 29 is driven by chain 25 that in turn is driven by sprocket wheel 37. A variable speed motor 39 drives sprocket 37, the speed of motor 39 being controlled to vary the speed of the conveyors. Conveyor 12 is driven by contact with conveyor 10 as will appear more fully below.

As seen better in FIG. 2 disc roll 20 is formed of a number of narrow discs 20a which are axially aligned but spaced apart on a common shaft 23. Disc roll 20 thus acts to support the metal belt 12 as if it were passing over a solid drum but it maintains the back surface of the belt free for application of copious quantities of cooling liquid. A plurality of lower spray nozzles 22 and upper spray nozzles 24 are provided for spraying the back surfaces of the lower and upper belts, respectively, with water to maintain these surfaces below red heat, while the belts sandwich the solidifying and cooling layer of abrasive 30 therebetween.

A furnace for melting the abrasive is schematically shown at 26 with a pouring spout 28 from which a stream of molten metal oxide 30 is poured. The furnace or ladle is mounted on pivot 27 so that it can be rocked on the pivot by means of sector gear 31 integral with the furnace, the sector gear being driven by worm 33 driven by motor 34 fixedly mounted on a stationary part of the support for the pivoting ladle. The motor 34 is controlled during a pour to cause the furnace to tilt in a manner to produce a continuous even quantity of molten oxide to flow from spout 28. This molten abrasive 30 is poured into the nip 11 between the belts 10 and 12 as they are brought together. As the two belts leave the curved path the belts are made to follow between guide means 14 and guide means 20, with the cooling layer of abrasive therebetween, they are held in their sandwiched relationship for movement in a planar path to the discharge end 32 of the apparatus by two sets of rollers 35 which are mounted in frames 38, at least one of these frames being pressed towards the other by means such as springs schematically indicated at 40 in FIG. 3. It will be noted that the position of guide roller 14 relative to guide means 20 and rollers 35 is such as to cause the belts 10 and 12 to bend around a convex path with belt 10 being free to move away from its contact with belt 12 as molten oxide is delivered into the nip formed at the meeting of the belts. Then the thin and brittle solidified sheet confined between the two conveyor belts is bent to a planar form as the belts move onto rollers 35, whereby the fracturing of solidified sheet is initiated and the sheet is to a considerable extent cracked up and broken into individual pieces.

In the preferred embodiment the rollers 35 that support the belts passing from guide means 14 and 20 are commercial conveyor rollers which are fairly widely spaced apart so as not to interfere, in any appreciable extent, with the spraying of the water on the outer surfaces of the sandwiched metal belts. Additional tensioning means (not shown) may be provided as desired to maintain the belts in adequate contact with the drive rolls. Thus the belt 12 is driven by motor 39 either by frictional contact from belt 10 directly onto belt 12 as shown in FIG. 6 or by contact through the metal oxide layer 30 disposed between the belts.

The molten abrasive which contacts the cold, dry metal conveyors freezes almost instantaneously at the surface of these metal sheets. The spacing between the two conveyor sheets, as they are brought together, is controlled by the rate at which the abrasive is poured therebetween and the rate at which the sheets are moving under the control of the sprocket drive from motor 39. When the sheets are moving fast and the abrasive flow is slow the thickness of the freezing abrasive layer can be maintained extremely thin, on the order of a few hundreths of an inch. When the speed of the belts is slower, and there is the same rate of flow of abrasive, the thickness of the freezing layer can be made greater, on the order of 1/16 inch and even as thick as 3/16ths of an inch.

The distance between the nip of the belts and the point where belt 12 leaves support means 20 is sufficient to produce a solidified curved sheet of metal oxide that is quite brittle in its solid or frozen state. When the belts pass from the curved or convex path, the sheet is made to flow into a planar path as the belts pass between rollers 35. As is known from the earlier Norton Company patents, changing the shape of the brittle sheet from curved to planar causes it to fracture and crack up into separate pieces. As here taught, when the brittle sheet is positively confined between the two conveyor belts a somewhat more complete breaking up action results. The broken pieces are collected at discharge 32 to be further crushed and sized to produce the desired abrasive grains. The fracture lines produced by this confined bending step results in broken pieces of metal oxide that may be easily crushed to the final abrasive gain size desired.

As the abrasive passes between the two belts and is held confined therebetween while it freezes and cools, the sensible heat is rapidly removed so that, as the belt opens up and the abrasive passes from the surface thereof as the bottom belt goes over the drum 16 the abrasive chips 30 are at black heat. At this point they will not be subject to deleterious oxidation and they can be either quenched in water or just allowed to cool to room temperature in air.

Several additional means are preferably provided for assuring that the two facing surfaces of the belts are dry. This includes a pair of squeegees 36 which serve to remove most of the water which is on the belt surfaces. Preferably, additional flame drying is accomplished as shown schematically at 50 and 52 where a plurality of flames are directed against an extended area of the back surfaces of the belts so that the belts are heated above the boiling point of water and thus no liquid can remain on these surfaces as they are brought together in the nip 11 to receive the molten abrasive. Any water on the surface in the nip 11 would, of course, be instantaneously vaporized causing porosity in the freezing abrasive and also reaction with sub-oxides and metallic constituents in the molten abrasive mixture. The squeegees and heating means are also preferably supplemented by air blasts from nozzles 54 and 56 which assist in removing bulk water from the surfaces to be dried. A shield 60 is preferably provided to keep the cooling water away from the lower belt 10 as it travels on its return path.

If desired as a further protection against the possible harmful effects of oxidation of the product as it is being solidified, those faces of the belts which are to be brought into a face-to-face relationship for receiving the molten abrasive layer therebetween, can be coated with a mold coating such as a layer of a hydrocarbon oil or carbon black, as shown in FIG. 5 for example, to provide a reducing atmosphere at the point of contact between the belts and molten oxide and to improve the flow of the molten abrasive across the surface of the belt and thereby improve the thermal contact between the molten abrasive and the metal belts. A crankcase oil coating is preferred since the carbon and hydrogen act as reducing agents in contact with the molten metal oxide. A carbon black coating can be provided if oil is not used, the carbon layer being deposited by the use of an oxygen-deficient acetylene torch burned in close proximity to the conveyor surface so that the carbon deposits from the flame on the working face of the conveyor.

In another embodiment of the invention, schematically indicated in FIG. 4, the two belts are not provided as continuous belts but are provided as long strips of metal which can be fed from two separate coils and subsequently wound up on take-up reels positioned beyond the discharge roll 16. In this case the apparatus is essentially the same as shown in FIGS. 1, 2 and 3 (although most portions of the apparatus have been eliminated from the drawing) with the exception that a supply reel is provided at 41 for feeding a long length of metal belt 12 to the disc drum 20, through the apparatus, over the return roll 18 and thence to a take-up reel 42. Similarly the bottom belt 10 can be fed from a supply 44 thereof, over the roll 14, over discharge roll 16 and on to another take-up roll 46. With this embodiment of the invention it is only necessary that the discontinuous strips be long enough to provide for feeding of sufficient footage of metal belts to the apparatus so as to take care of a complete pour from the electric furnace 26. This system has the advantage that absolute prevention of moisture entering the nip is assured. With this arrangement the continuous belts can be used just once or they can be used many times depending upon the preferred economics of the casting operation.

While one specific form of the invention has been described above (with one additional modification of belt feed) it is apparent that numerous other modifications of the invention will be obvious to one skilled in the art and such modifications are intended to be included within the scope of the claims appended hereto. For example instead of using a cooling medium such as water, the preferred embodiment, another cooling medium such as solid carbon dioxide powder or low temperature gas (e.g. Nitrogen at $-195°$ C.) can be sprayed against the back surface of the belt.

What is claimed is:

1. Process for rapidly chilling molten metal oxide to form thin fractured sheets of finely crystalline solid oxide, comprising the steps of advancing a pair of metallic belts into face-to-face position, applying a cooling liquid to the back surfaces of the belts as they move into face-to-face position, pouring a molten oxide into the nip between the approaching faces of the belts, and advancing said belts from the pouring position to a discharge position where the belts are separated and the solidified oxide sheets are discharged therefrom, the belts being passed around a convex surface as they leave the pouring position so that in the absence of poured oxide the belts would be in face-to-face contact, whereby the spacing between the belts as they pass around the convex surface is controlled by the amount of oxide poured into the nip and the speed of movement of the belts.

2. The process of claim 1 wherein the speed of the belts and the distance between the nip of the belts and where they separate is so related that the oxide is cooled to below red heat before being discharged from between the belts.

3. The process of claim 1 wherein the metal oxide is held confined between said belts until discharged therefrom.

4. The process of claim 3 wherein the surfaces of said belts are coated with a mold coating to produce a reducing atmosphere around the oxide between the belts.

* * * * *